W. F. FOLMER.
FOCUSING ATTACHMENT FOR CAMERAS.
APPLICATION FILED JAN. 24, 1907.

922,411.

Patented May 18, 1909.
3 SHEETS—SHEET 1.

W. F. FOLMER.
FOCUSING ATTACHMENT FOR CAMERAS.
APPLICATION FILED JAN. 24, 1907.

922,411.

Patented May 18, 1909.
3 SHEETS—SHEET 2.

Witnesses
Walter B. Payne.
Clarence A. Bateman.

Inventor
William F. Folmer
By Church & Rich
his Attorneys

W. F. FOLMER.
FOCUSING ATTACHMENT FOR CAMERAS.
APPLICATION FILED JAN. 24, 1907.
922,411.
Patented May 18, 1909.
3 SHEETS—SHEET 3.
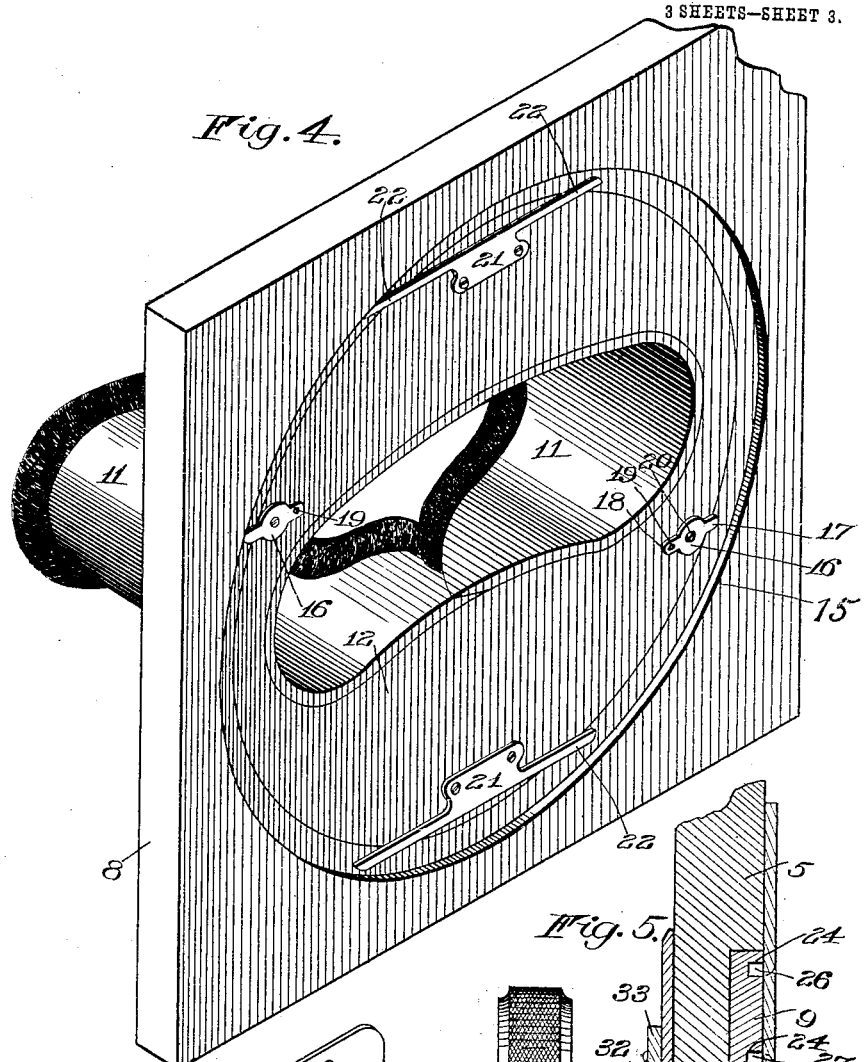
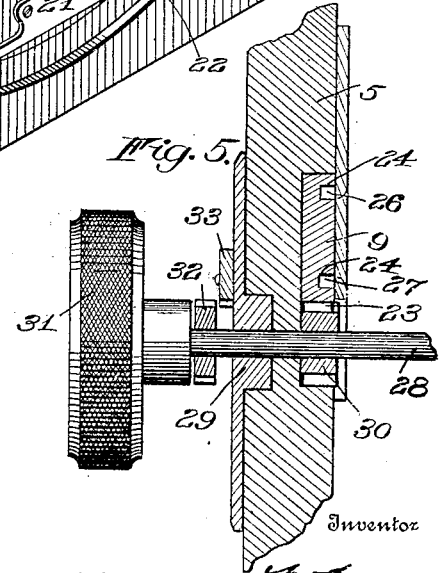
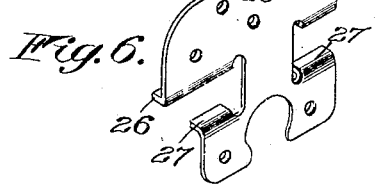
Witnesses
Walter B. Payne.
Clarence A. Bateman.
Inventor
William F. Folmer
By Church & Rich
his Attorneys

UNITED STATES PATENT OFFICE.

WILLIAM F. FOLMER, OF ROCHESTER, NEW YORK, ASSIGNOR, BY MESNE ASSIGNMENTS, TO EASTMAN KODAK COMPANY, OF ROCHESTER, NEW YORK, A CORPORATION OF NEW YORK.

FOCUSING ATTACHMENT FOR CAMERAS.

No. 922,411.  Specification of Letters Patent.  Patented May 18, 1909.

Application filed January 24, 1907. Serial No. 353,776.

*To all whom it may concern:*

Be it known that I, WILLIAM F. FOLMER, of Rochester, in the county of Monroe and State of New York, have invented certain new and useful Improvements in Focusing Attachments for Cameras; and I do hereby declare the following to be a full, clear, and exact description of the same, reference being had to the accompanying drawings, forming a part of this specification, and to the reference-numerals marked thereon.

My present invention relates to improvements in focusing attachments for cameras, and has for its object to provide a hood adapted to be applied to a camera to facilitate the focusing of the image on the usual screen preparatory to an exposure of the sensitized material, the present invention enabling the focusing operation to be conveniently accomplished by the photographer without the necessity of employing the objectionable focusing cloth, and when the device is applied to a camera, it will present a neat appearance and compact arrangement, which especially adapts it to studio and similar uses.

To these and other ends the invention consists in certain improvements and combinations of parts, all as will be hereinafter more fully explained, the novel features being pointed out in the claims at the end of the specification.

Figure 1:
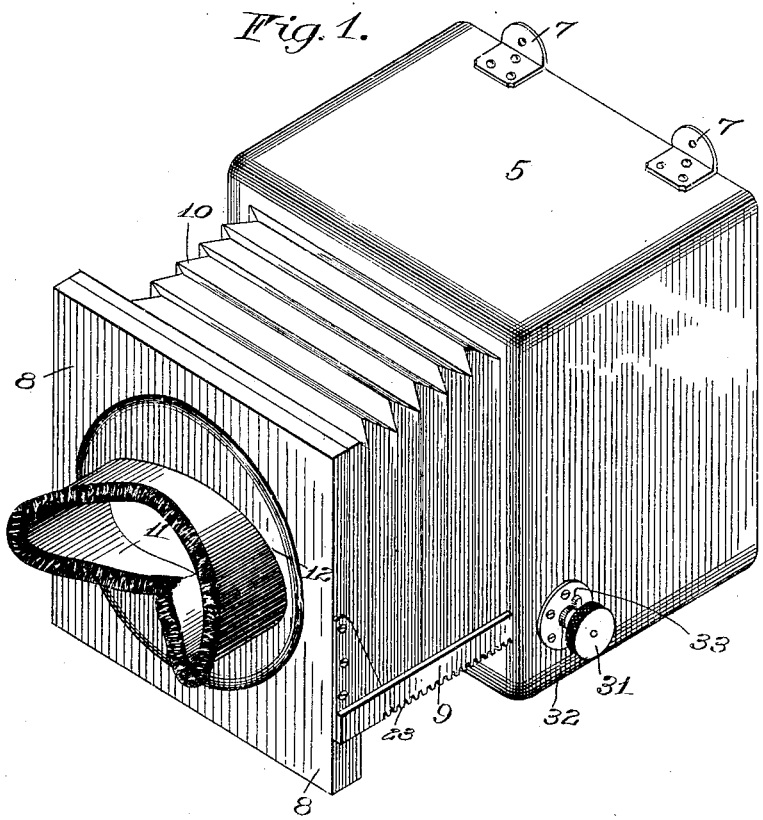
Figure 2:
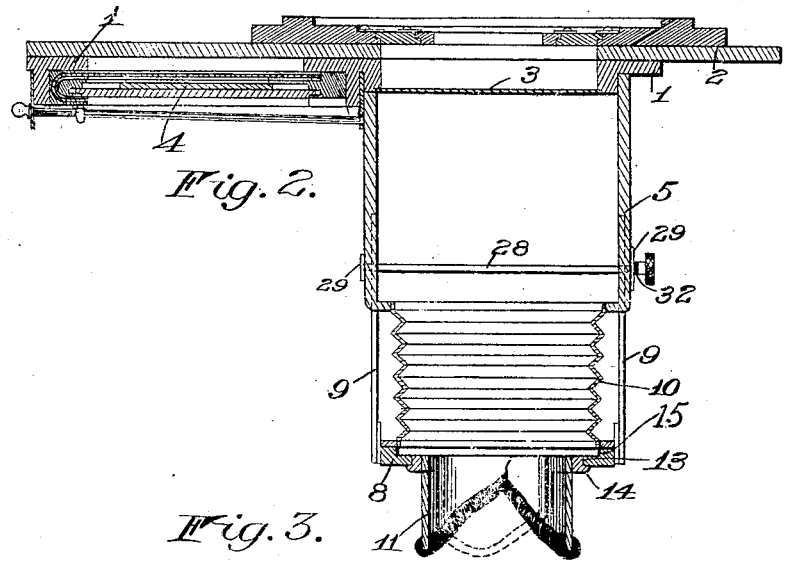
Figure 3:
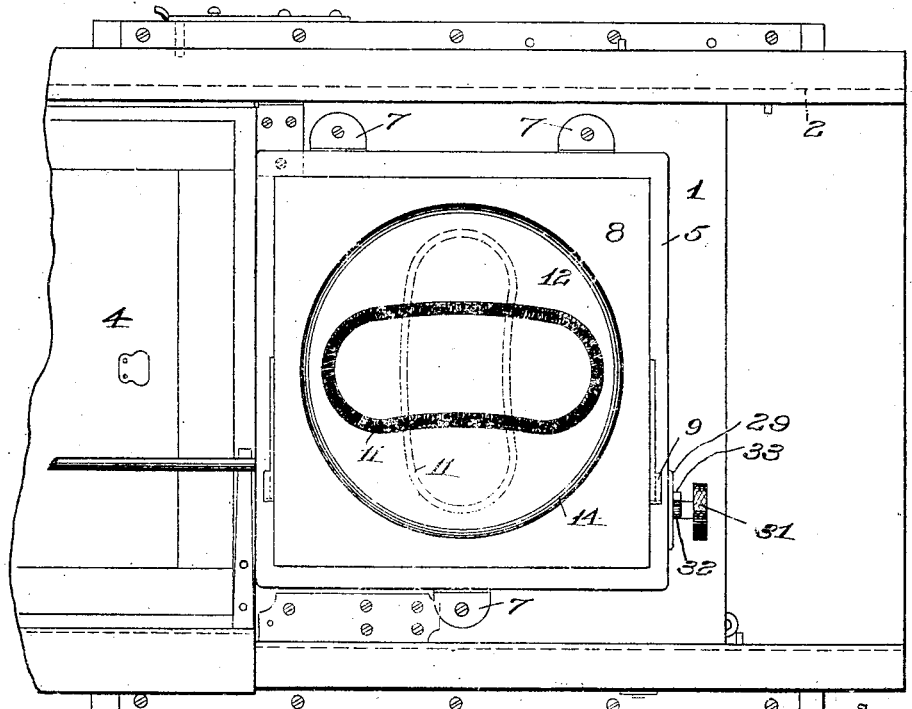

In the drawings: Figure 1 is a perspective view of a focusing hood constructed in accordance with my present invention. Fig. 2 represents a horizontal section through the hood and a portrait attachment to which the invention in the present instance is applied. Fig. 3 represents a rear elevation of the camera and the portrait attachment, showing the focusing hood attached to the latter. Fig. 4 is a perspective view showing the front board removed from the focusing hood. Fig. 5 is a sectional view of a portion of the casing of the hood showing the adjusting devices for the front board of the hood, and Fig. 6 is a perspective view of one of the guide plates for the front board.

Similar reference numerals in the several figures indicate similar parts.

Devices constructed in accordance with my present invention are applicable generally to cameras of various forms, the hood shown in the present embodiment of the invention being shown applied to a portrait attachment such as that shown in Letters Patent No. 833,886, although it will be understood of course that the invention is not limited in this respect, and that the hood is adapted to be applied to cameras and attachments of various forms.

The portrait attachment to which the hood is applied in the present instance embodies generally, a horizontally-adjustable slide 1, mounted in ways 2 on the camera back and provided at one side with a focusing screen 3, and at the other side with a plate holder 4, the focusing screen and plate holder being adapted to be brought alternately into the field of the lens by adjustment of the slide 1.

The focusing hood shown in the present instance is adapted to be applied in rear of the focusing screen,—that is to say, in alinement with the optical axis of the camera lens, and it comprises a casing 5 open at its rear and adapted to be applied to the camera back, or as in the present instance to the rear face of the adjustable slide 1 so as to surround the focusing screen, lugs 7 being provided by means of which the hood may be secured to the slide by screws or other suitable means. The casing of the hood is closed at the rear by a rear board 8, and the bellows 10 connecting the latter and the casing, the rear board being provided with guides 9 at either side adapted to coöperate with suitable ways in the casing to permit the rear board to be set at different distances from the screen, thus enabling the photographer's eyes to be properly focussed on the image on the screen during the focusing operation, a shield 11 being preferably provided which is adapted to permit an observation with both eyes and shaped to closely fit about the eyes and thus exclude light from the rear of the screen.

It is sometimes desirable to take an observation of the screen while the photographer stands at one side of the camera, as it will avoid the necessity of passing completely behind the camera for each observation while the light effects and other appurtenances are being adjusted for the sitting, and for this purpose the shield 11 is rotatable in a plane parallel to that of the focusing screen, so that an observation may be had of the screen while the photographer stands at the rear of the camera, at which time the shields will occupy the horizontal position as shown in Figs. 1 and 3, or an observation may be had conveniently from one side of the camera by turning the shield into a substantially vertical position such as shown in dotted lines in Figs. 2 and 3, and observing the image on the screen with the eyes in an inclined position, as would be the most convenient in this instance.

Any suitable construction may be employed for permitting the relative pivotal movements of the screen relatively to the hood, the shield in the present instance being mounted on a disk 12, having a circular portion 13 fitting a corresponding aperture in the rear board, and provided with a flange 14 at the rear coöperating with the rear surface of the front board for closing the joint thus formed to exclude light and prevent disengagement of these parts in one direction, the front face of the rear board being preferably provided with a circular depression or recess 15 surrounding the aperture therein and adapted to be engaged by suitable projections or buttons 16, arranged in the present instance on the disk, these buttons embodying plates, each having an arm 17 arranged to overlap the edge of the rear board to prevent rearward movement of the disk carrying the hood, and also having an oppositely-arranged projection 18 adapted to receive a fastening pin 19 for preventing turning movement of the plate about the central screw 20 while these buttons are in operative position, but these buttons may be turned by removal of the screw 20 so that the projection 17 thereon clears the coöperating edge of the rear board, thus permitting removal of the focusing hood for cleaning or repairs of parts. In order to yieldingly retain the shield in adjusted position, it is preferable to provide suitable friction devices between the disk and the rear board, these devices in the present instance embodying plates 21 suitably secured to one of the parts, preferably the disk carrying the shield, and having spring arms 22 adapted to engage with suitable pressure, the front surface of the rear board of the hood so that the shield cannot become accidentally turned, although it may yield under the pressure of the hand.

Any suitable means may be provided for guiding and adjusting the rear board relatively to the casing in order that the eyes of the operator may be properly focused on the screen, the guides 9 in the present instance being provided with racks 23 on one edge and having longitudinal guiding grooves 24 at their inner sides, a plate 25 secured to the inner side of the casing and having inturned flanges 26 and 27 serving to coöperate with the guiding grooves of the guides to insure movement of the rear board preferably in alinement with the optical axis of the camera lens. An operating shaft 28 is mounted transversely of the casing and provided with bearing plates 29, the pinions 30 on this shaft serving to coöperate with the rack teeth on the respective guides to produce longitudinal movement of the latter when the said shaft is rotated by the milled head 31 arranged on the exterior of the casing. It is also preferable to employ a device for locking the rear board or shield in the different adjusted positions, the device shown in the present instance embodying a pinion 32 fixed to the operating shaft, and adapted to be moved into and out of coöperative relation with a toothed portion 33 fixed to one of the bearing plates 29, the pinion 30 being sufficiently wide to remain in coöperative relation with the rack teeth on their respective guides when the shaft is thus shifted longitudinally.

A focusing attachment constructed in accordance with the present invention is comparatively simple in construction and may be readily adapted for attachment to cameras and attachments of various forms, and by its use, the focusing cloth as heretofore used may be entirely dispensed with, facilitating manipulation of the camera, particularly in arranging the lighting effects and other appurtenances usually employed in sittings for portraits, and the image on the screen will be sharply defined and may be viewed at the best advantage with the eyes in proper focus.

I claim as my invention:

1. In a focusing hood for cameras, the combination with a suitable casing adapted to be applied to a camera back, of a rear board for the casing having an opening therein and a circular depression or recess surrounding said opening, of a disk rotatably fitted in the latter and provided with a suitable sight aperture and friction devices on the disk engaging the lateral walls of the recess for yieldingly retaining the disk in different adjusted positions.

2. In a focusing hood for cameras, the combination with a suitable casing adapted to be applied to a camera back, a rear board therefor carrying a suitable eye-piece and collapsible bellows connecting the rear board and casing, of a rigid extensible supporting guide extending between the rear board and casing and having its inner ends arranged within the latter for adjusting the members relatively, the said guide being retracted inwardly within the casing when the rear board is moved in the direction of the latter.

3. In a focusing hood, the combination with a suitable casing and a rear board therefor provided with an opening, of a disk having a portion rotatably fitting said opening and provided with a suitable sight aperture through which observations of the screen may be had at different angles of adjustment of said disk, and friction devices for yieldingly retaining the disk in different adjusted positions embodying spring plates secured to one of the parts and having spring-pressed arms frictionally engaging a surface on the other part.

4. In a focusing hood for cameras, the combination with a suitable casing adapted to be applied to a camera back, of a rear board for the casing, guides attached to the rear board and having longitudinal guiding grooves thereon and plates secured to the casing having laterally turned flanges arranged to coöperate with said grooves for insuring alinement of the rear board and casing at different relative adjustments.

5. In a focusing hood, the combination with a suitable casing, of a rear board having a bellows attachment with said casing, guides fixed to the rear board and coöperating with suitable ways in the casing, and having racks formed thereon, a shaft mounted in the casing and having pinions thereon arranged to coöperate with the racks on said guides, and an operating head on said shaft exterior to the casing for operating the shaft to adjust the position of the rear board relatively to the casing.

WILLIAM F. FOLMER.

Witnesses:
CLARENCE A. BATEMAN,
WALTER B. PAYNE.